Feb. 12, 1952     G. A. LAWRENCE     2,585,799
APPARATUS FOR SMOKING FISH
Filed Feb. 11, 1947     3 Sheets-Sheet 1
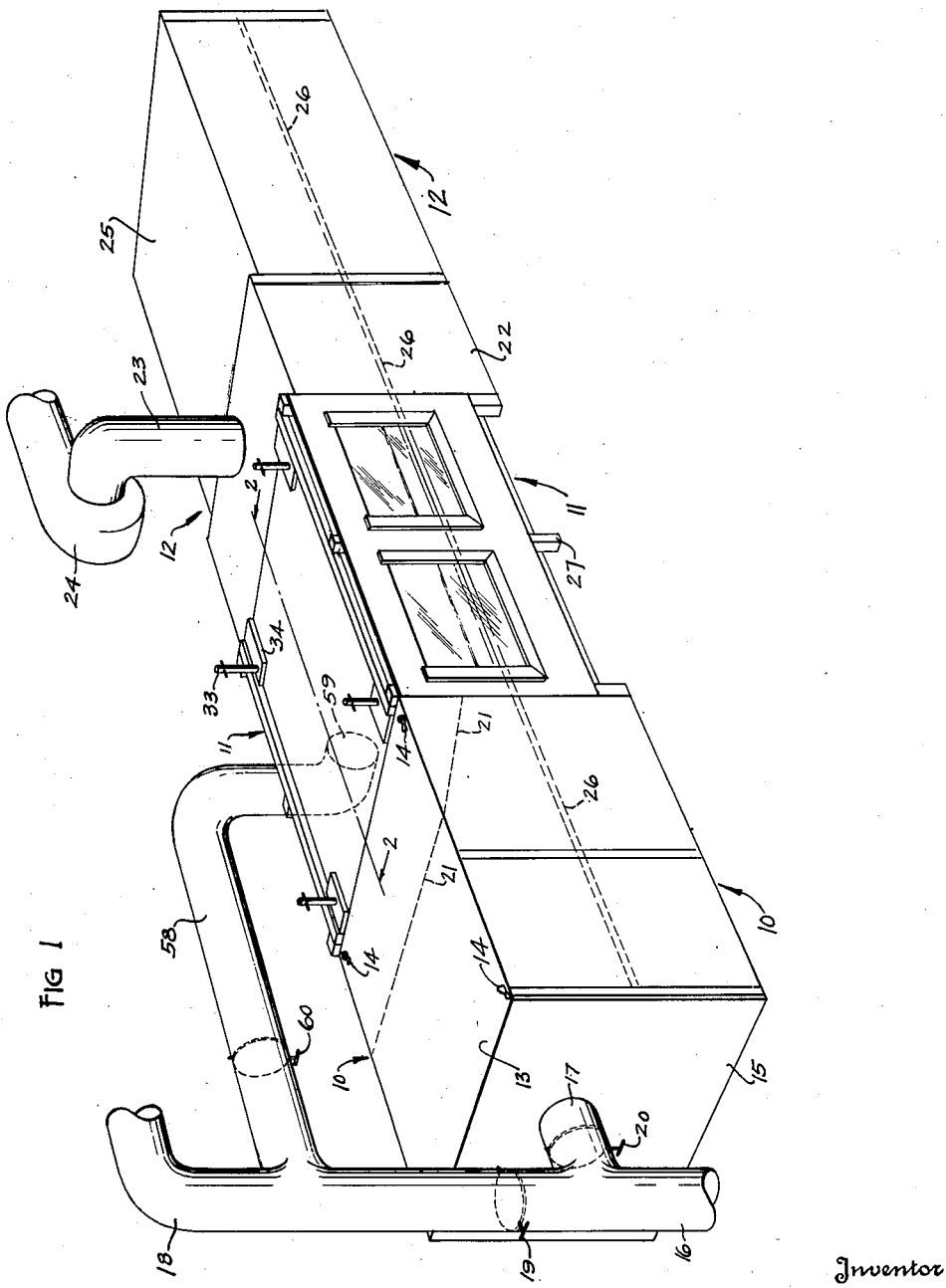
Inventor
GLEN A. LAWRENCE Feb. 12, 1952 G. A. LAWRENCE 2,585,799
APPARATUS FOR SMOKING FISH
Filed Feb. 11, 1947 3 Sheets-Sheet 2
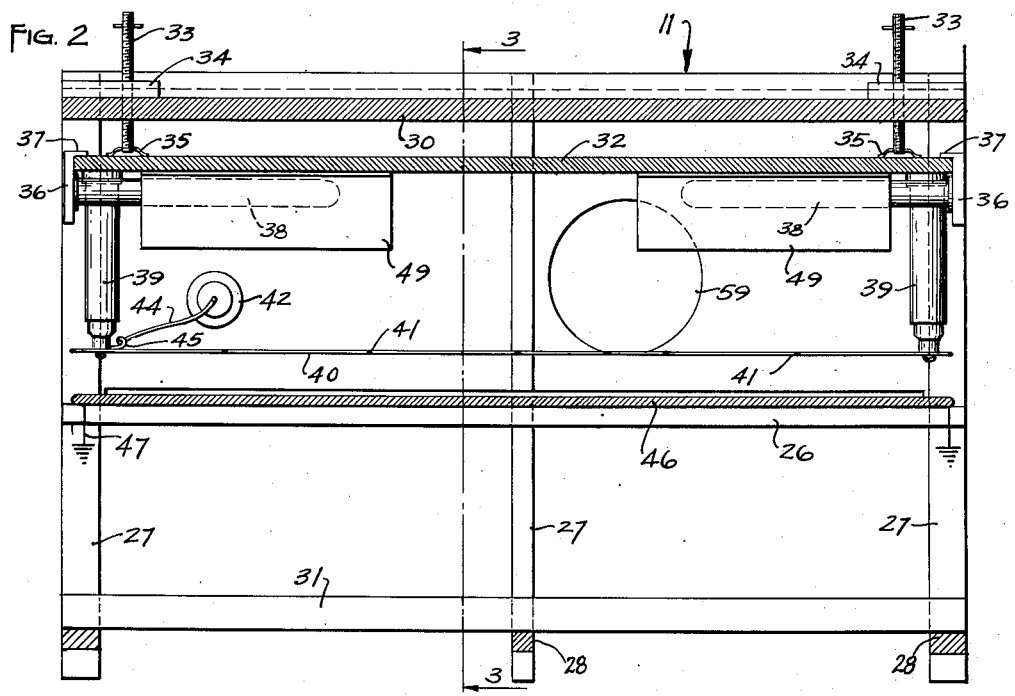
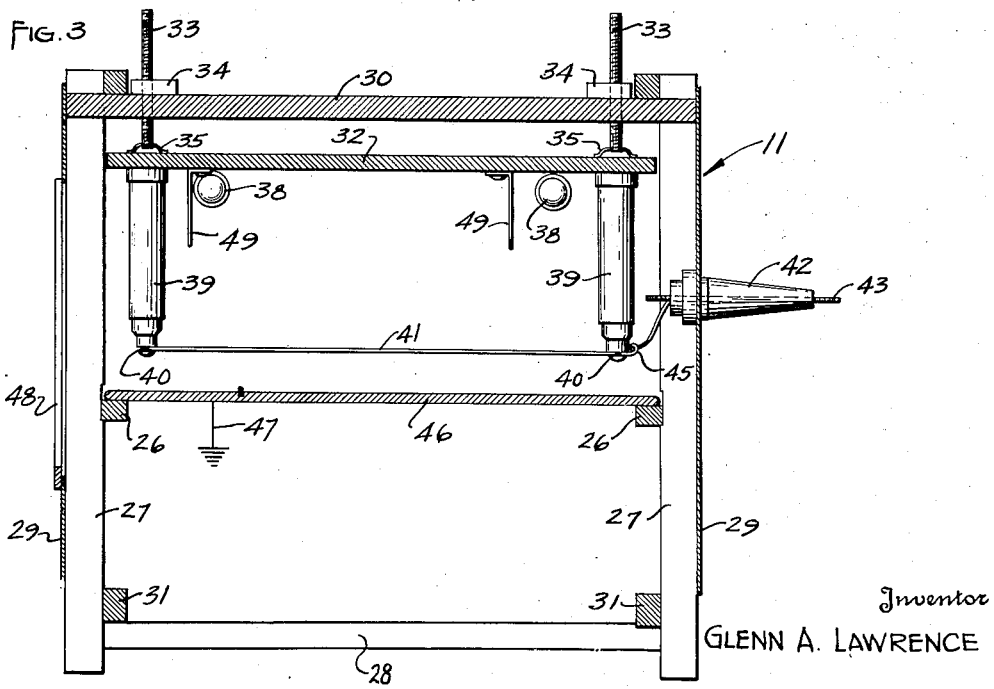
Inventor
GLENN A. LAWRENCE

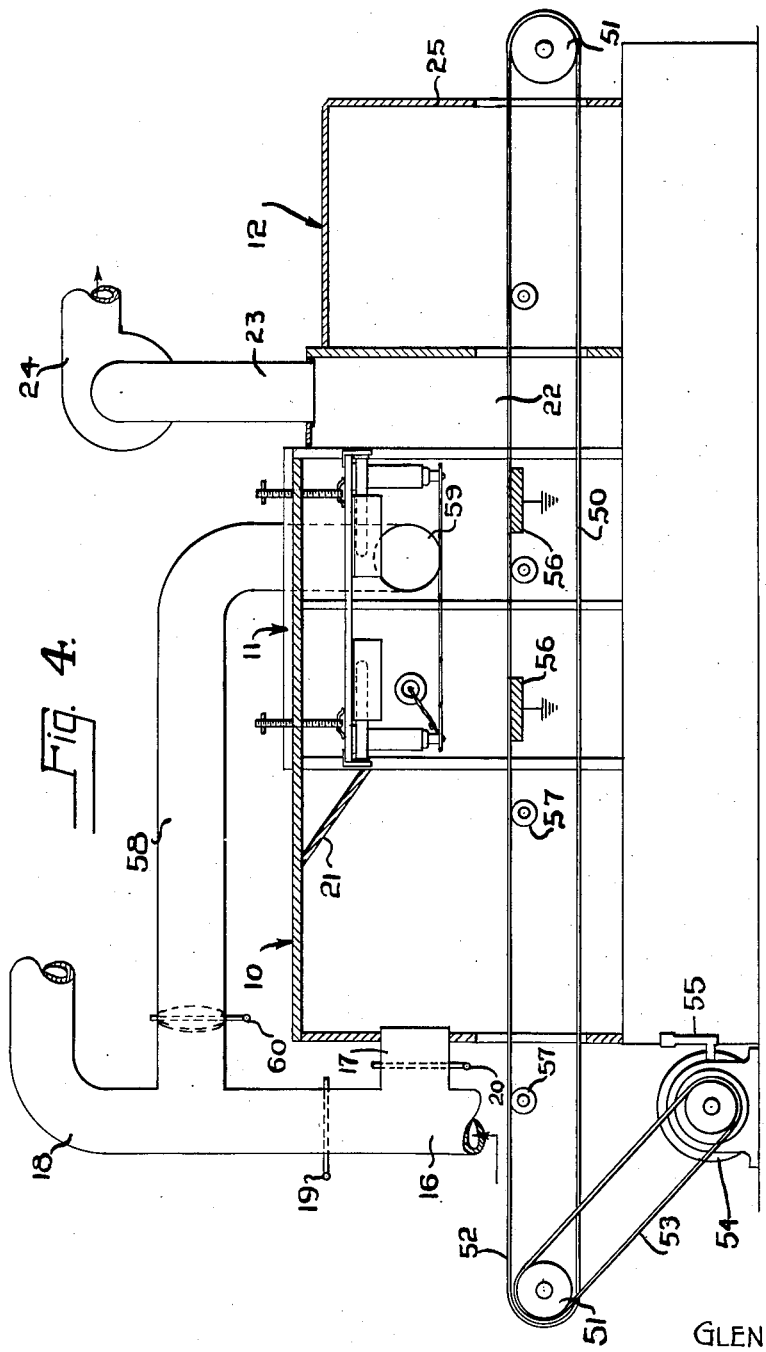

Patented Feb. 12, 1952

2,585,799

UNITED STATES PATENT OFFICE 2,585,799

APPARATUS FOR SMOKING FISH

Glenn A. Lawrence, Belfast, Maine

Application February 11, 1947, Serial No. 727,882

8 Claims. (Cl. 99—261)

The present invention relates to methods and apparatus for smoking foods, and has particular reference to improvements in methods and apparatus for the flavoring of fish by the electrodeposition of smoke.

The cleansing of airstreams by electrostatic treatment is accomplished by establishing electric fields or zones of force across the airstream which electrically charge airborne particles, impelling them to disposition areas. Due to the normally high velocity of the airstreams, extremely high voltages must be employed in order to effect the desired degree of separation of airborne particles. The important consideration in the construction of air cleansing apparatus is that a high percentage of the airborne particles be deposited somewhere in the collector cells, attaining a maximum of particle removal.

Attempts have been made to apply this principle of electrodeposition of airborne particles to the treatment of foods with smoke, assisting in flavoring and preserving the foods. Considerations of cost and safety have seriously impeded industrial development and use of these processes and apparatus. The extremely high electrical voltages employed present a definite fire hazard, and render the apparatus too dangerous for operation by untrained personnel. Food smoking methods and apparatus have been characterized by tedious manual operations, as well as bulky equipment dimension. The use of high electrical voltages incurs the production of large amounts of ozone, which undesirably modify the taste characteristic of the foods under treatment, corrode the metal parts of the apparatus, and have irritative effects on the operating personnel.

It has been difficult to standardize or secure any control of the extent of smoking of the food materials being treated by smoke electrodeposition methods. This is particularly the case in adaptation of smoking methods and apparatus to assembly line or mass production methods of food treatment, wherein the food must be treated speedily in order to reduce spoilage and reduce the unit cost. Foods which may be associated with a liquid component for flavoring or preserving purposes offer a particular problem. The smoking of partially packaged foods such as fish in open top receptacles or cans has not been feasible, because of lack of uniformity and control of the smoking process.

The smoking of fish requires the deposition of a predetermined amount of smoke with perfect uniformity over a selected area of the fish flesh. The flesh is easily burned or tainted by arcing or shorting out of the electrical means employed to effect the smoke deposition. Saleability of the smoked fish product depends in great degree on achievement of uniformity of taste and color. Extended treatment of the fish in the heat incident to the smoke stream and smoke electrodeposition means, may dry out the smoked product in undesirable degree.

The present invention has for an object the provision of a novel method and apparatus for the smoking of fish and other foods which obviates the aforementioned disadvantages.

A further object is to provide a novel method of smoking fish which effects a considerable saving of time in the normal fish smoking operation, reducing the number of manual operations necessary to carry out the smoking process.

A further object is the provision of apparatus for smoking fish which is small, compact, of simple design, and inexpensive to construct and operate.

A further object is to provide an apparatus for the electrodeposition of smoke on fish which is time saving in operation, and safe for inexperienced operators to work with.

A further object is to provide a method and apparatus for smoking fish which may be controlled to provide a desired degree of smoking of a selected fish surface such as an exposed surface of a partially packaged fish product, providing a standard smoked product by a technique readily adaptable to current operating conditions in the fish packing industry.

A further object is to provide a fish smoking apparatus capable of controlled intermittent or continuous operation.

Other objects and advantages of the invention will be apparent from the following detailed description thereof and the accompanying drawings, wherein:

Figure 1 is a perspective view of the assembled smoking apparatus of the invention;

Figure 2 is a vertical elevation of the smoke deposition chamber taken along the line 2—2 of Figure 1;

Figure 3 is a cross sectional view thereof taken along the line 3—3 of Figure 2; and Figure 4 is a diagrammatic view of the smoking apparatus modified for continuous operation.

Referring to Figure 1 of the drawings, the smoking apparatus of the invention includes three primary elements comprising a smoke inlet compartment 10, a smoking compartment 11, and an exit compartment 12.

The compartments are constructed of smoke impervious materials secured to the usual suitable frame members, preferably consisting of well dried paraffin impregnated wood, which is relatively impervious to the effects of smoke and minimizes short circuiting due to the presence of moisture during operation of the apparatus. The compartments 10, 11 and 12 may be removably secured adjacent one another to facilitate disassembly of the compartments for purposes of cleansing. The adjoining edges of the compartments may be provided with suitable felt gaskets or similar sealing means, not shown, to inhibit the escape of smoke during operation of the smoking apparatus.

The inlet chamber 10 is provided with a top 13 removably secured to the frame of the chamber 10 by bolts 14 to permit of access to the inlet and smoking compartments. A front panel 15 of the chamber 10 preferably is formed of a fireproof material such as galvanized iron, to reduce the fire hazard incident to the introduction of hot smoke into the compartment.

A smoke pipe 16 leads from a source of wood smoke, not shown, and is provided with an elbow 17 opening into the front end of the chamber 10 through the metal panel 15. An extension 18 of the pipe 16 forms a bypass leading to smoke exhaust means such as a chimney, not shown. The elbow 17 and extension 18 are provided with dampers 19 and 20 to permit of control of the volume of smoke introduced into the inlet compartment 10. A smoke baffle plate 21 is provided for purposes of directing the flow of smoke from the inlet compartment 10 into the smoking chamber 11.

The exit compartment 12 consists of a smoke exiting compartment 22 provided with a smoke pipe 23 leading to smoke exhaust means, not shown. To facilitate movement of smoke from the inlet compartment 10 through the smoking compartment 11 to the exhaust means, a suction fan 24 is provided in the pipe 23. A box-like extension 25 may be provided adjacent the existing compartment 22 to receive means for supporting smoked fish discharged from the smoking compartment 11, to be described.

Guide rails 26 extend longitudinally through the smoking apparatus forming a support for the insertion and withdrawal of trays carrying particles of fish to be smoked, such as filet or fish packed in open top containers. The end of the compartment extension 25 is provided with a suitable door, not shown, to permit of handling the trays of fish.

The smoke generator may comprise any type of burner capable of producing a sustained flow of smoke. It has been found convenient to use an electric heater for maintaining a combustible substance such as sawdust at a smoking temperature. The volume of smoke can be adjusted at the source by the provision of suitable rheostatic controls. In combination with the damper means, this provides a smoke supply system capable of fine smoke volume and density adjustment.

Referring to Figures 2 and 3, the smoking compartment 11 comprises supporting legs 27 secured by cross members 28 forming a frame enclosed by sidewalls 29, a top piece 30 and a bottom piece 31. The frame members preferably are of wood or other non-conductor of electricity, secured by pegs or plastic securing members, minimizing the amount of metals employed in assembling the smoking compartment. The enclosing walls are preferably of natural or artificial board, fitted to form a relatively tight smoke compartment.

The ionizing unit comprises a frame 32 suspended from the top piece 30 by an adjustable screw suspension system comprising four threaded screws 33. The screws 33 are threadedly supported by Bakelite blocks 34 carried on the frame cross members 28, and are secured to the frame 32 by caps 35. The screw suspension system permits of vertical raising and lowering of the frame 32 by manipulation of the screws 33. The ends of the frame 32 are provided with flanged members 36 provided with extensions 37 which limit upper vertical adjustment of the frame 32. The flanges 36 carry a plurality of electric lamps 38 connected to a source of power, not shown, for purposes of illuminating the smoking chamber during operation.

The frame 32 carries a plurality of stand-off electrical insulators 39, one at each of the four corners thereof projecting vertically downwardly into the smoking chamber. Steel conductor rods 40 extend longitudinally of the smoking compartment depending from each pair of insulators 39 as shown in Figure 2, forming parallel conductors. A plurality of ionizing wires 41 span the transverse gap between the parallel conductors 40, laying directly across the path of smoke flow. The ionizing wires 41 are shown as seven in number, but the number may be varied in accordance with the requirements of a particular smoking operation. A high voltage bushing 42 carries connections for tapping a suitable source of power through a cable 43. A cable 44 secured to a hook connection 45 on one of the insulators 39 energizes the ionizing network. The ionizing network is operated by conventional switch means, not shown.

A fish tray 46 is carried upon the supporting guides 26 to operating position in the smoking chamber 11 beneath the ionizing network. When in operative position, the tray 46 is grounded electrically with suitable ground connections 47. The tray 46 is constructed of an electrically conducting material such as a suitable metal, and may be a solid piece or perforated for purposes of drainage and to eliminate unnecessary weight.

The parallel conductors 40 should be of sufficient strength to support the ionizing wire network against displacement by accidental contact with the fish articles being smoked. Steel rods three-sixteenths of an inch in diameter have been found satisfactory in this regard. The ionizing wires 41 should be of reduced diameter to minimize the voltage necessary to ionize the smoke flow, yet sufficient in strength to resist breakage. It is preferred to use tungsten wires of a diameter in the vicinity of 0.006 inch, but an alloy resistor wire is satisfactory.

As shown best in Figures 1 and 3, the sidewall 29 of the smoking compartment 11 is provided with windows 48 to permit of observation of the interior of the smoking compartment, during operation, for purposes of controlling the degree of smoking of the fish. Shades 49 are provided to shield the eye of the observer from glare emanating from the lamps 38.

The smoking apparatus may be modified for continuous operation, as shown in Figure 4, by the provision of suitable endless conveyor mechanism in the place of the fish trays 46. In the embodiment shown, an endless conveyor belt 50 is rotatably mounted on end rollers 51 provided with pulleys 52 driven by a belt drive 53 powered by an electric motor 54. The speed of operation of the belt 50 may be adjusted by provision of adjustable speed pulleys of conventional type, not shown, or by use of an adjustable speed electric motor 54. A suitable clutch mechanism 55 permits of establishing or breaking the power connection at the will of the operator. The belt 50 is grounded electrically by a series of contact surfaces 56 wired to ground in the smoking chamber.

In the place of the guides 26 employed with the fish tray embodiment of the invention shown in Figures 2 and 3, a series of belt supporting rollers 57 are provided extending transversely across the compartments 10, 11 and 12. The rollers 51 and 57 are formed of electrically non-conducting materials to prevent grounding of the conveyor belt platform other than through the contact surfaces 56.

In a preferred form of the invention, an auxiliary supply smoke pipe 58 leads off the smoke exhaust pipe 18 to an entrance 59 at the rear portion of the smoke chamber 11. This auxiliary source of supply of smoke is controlled by operation of a damper 60 to provide a more dense volume of smoke in the portions of the smoke chamber 11 situated remotely from the main smoke source. This embodiment of the invention overcomes the disadvantageous results of the normal tendency of the smoke stream to thin out due to initially heavy precipitation of smoke particles as the smoke stream progresses across the ionizing network, augmenting the smoke supply in regions remote from the main source.

In operation, the method of the invention may be employed for the treatment of any food or other material desired to be smoked. The invention is particularly applicable for smoking flesh such as fish flakes or filets which are formed in relatively flat strips, or fish which have been partially packaged by insertion in an open top container for smoke treatment prior to closure of the container. It has been found that when packed fish are smoked, the smoke is deposited evenly over the exposed surface of the fish. The smoke permeates the fish satisfactorily during subsequent treatment, such as a cooking operation. Such materials, particularly when packaged, cannot be manipulated advantageously on hooks or other devices conventionally employed to convey foods through the usual smoking apparatus. The method of the invention is particularly suited for the smoke treatment of more delicate flesh or other materials which spoil upon extended treatment or upon the application of excessive heat. The method and operation of the apparatus will be described with reference to the smoking of flakes of fish which may be in unclosed containers, it being understood that this specific embodiment of the use of the invention is not to be regarded as limitative of the scope thereof.

Flakes of fish are thoroughly cleansed and laid upon the tray 46, which is inserted in the smoking chamber 11 upon the guides 26 through the entrance chamber 10. The clearance between the tray 46 and the ionizing network 41 is adjusted for maximum efficiency of operation. Normally, this clearance should be in the vicinity of one and one-half to two inches above the surfaces of the fish flakes, to meet the essential requirements of smoke area coverage and uniformity of smoke deposit. Operation of the smoke generator is initiated and the volume of smoke admitted to the smoking chamber 11 adjusted by manipulation of the dampers 19 and 20 in coordination with the speed of operation of the smoke exit suction fan 24. A voltage of 10,000 volts is impressed on the ionizing wires 41 of the ionizing network, charging the smoke particles suspended in the airstream and impelling them away from the wires 41 towards the electrically grounded tray 46 carrying the fish flakes. A heavy deposit of smoke is deposited uniformly over the exposed surfaces of the fish flakes. By observing the color of the fish flakes through the windows 48, the operator may determine visually when the smoking operation has been carried to the desired degree of completion. To terminate the smoking operation, undeposited smoke is exhausted through the pipe 23, the energizing of the ionizing network is terminated, and the fish tray 46 withdrawn from the smoking compartment 11 through the exit compartment 12. The smoking operation is then repeated with a fresh tray of fish.

The length of time of treatment of the fish flakes is controlled in accordance with the variable factors of smoke draft intensity, rate of smoke generation, distance between the ionizing network and fish tray, and the voltage impressed on the smoke ionizing electrodes. By adjustment of these variables, a satisfactorily smoked fish flake may be obtained in from three to five seconds, employing 10,000 volts. This is a markedly reduced period of smoke treatment compared with normal practice, which requires from three to twelve hours of continuous smoking treatment.

In the embodiment of the invention adapted for continuous operation, fish flakes or open top containers packed with fish are deposited on the conveyor 50 for carriage through the smoke chamber 11. Again, the variables of smoke density, voltage, and tray clearance are adjusted by the operator in accordance with the speed of the conveyor. In normal operation, with a conveyor speed of 12 feet per minute and a voltage of 12,000 volts impressed on the ionizing electrodes, a satisfactory deposit of smoke is deposited on the fish flakes or the fish surfaces in the containers in a 15 second period of time. The smoke deposit is characterized by absolute uniformity on the surface of the fish. The slight position irregularities associated with standstill smoking operations under the smoke ionizing network, are averaged out completely in the continuous smoking operation. Conveyor speeds as high as 36 feet per minute, have been employed with satisfactory results, resulting in uniform smoking of 12 fish flakes, 22 by 36 inches in dimension, per minute. At the higher conveyor speeds, it is desirable to increase the length of the smoke chamber 11 to afford an exposure of each fish flake to bombardment by the charged smoke particles for a minimum of 15 seconds, in order to meet the most exacting requirements of taste, smoke deposit density, and color.

The method and apparatus of the invention fulfills the expressed objects of accomplishing the quickest, most efficient smoking of fish, consistent with required values of cost and safety, particularly from the standpoint of use of a suitable electrical voltage value. The invention is most advantageously employed in the smoking of fish or other foods already packed in the can, minimizing the number of manual operations which must be performed by the operator to prepare the final product. The smoking time has been reduced markedly from that normally required in smoking operations for the treatment of foods. The requisite electrical discharge from the ionizing network is produced by a very moderate value of voltage, with minimum liability of spark or arc breakdowns, and the production of ozone. The smoke velocities employed are moderate, never of necessity exceeding 100 feet per minute, permitting maximum electrodeposition of smoke particles with the low voltage impressed on the ionizing network. Thus the method and apparatus of the invention are safe for industrial application, and may be fitted easily into normal operating routines of the commercial fish packing factory.

It will be apparent that the smoke compartment 11 may be modified to receive a plurality of electrically grounded trays 46 superimposed to form a vertical stack of trays bearing fish flakes, or open cans of fish, bearing in mind the clearances to be allowed between the ionizing network and the trays to achieve optimum smoke deposition results. For maximum uniformity of smoke deposit, a plurality of ionizing networks may be provided, simply by extending the downwardly extending insulators 39 to include fastening means for more than one frame 32, or by providing separate sets of insulators 39 for each frame 32.

The invention has been described herein with reference to specific structure for purposes of amplifying and explaining the basic considerations underlying the inventive concept. The use of equivalents has been suggested herein and other substitutions will be apparent to one skilled in the art. It is to be understood, accordingly, that the invention is to be limited only as defined in the appended claims.

I claim:

1. Apparatus for smoking fish comprising smoke producing means, a smoke compartment, a fan for drawing smoke through said compartment, an ionizing network in said compartment for electrically charging the smoke particles, an electrically grounded tray for supporting fish adjacent and in spaced relationship with the ionizing network, adjustable supporting members for adjusting the ionizing network relative to the tray to effect a desired rate of deposition of smoke on the fish, and means for removing the tray from the smoke compartment.

2. Apparatus for smoking foods comprising smoke producing means, a smoke compartment, first smoke inlet means for introducing smoke into the compartment, second smoke inlet means for introducing smoke into a portion of the compartment removed from the said first inlet means, fan means for drawing smoke through the compartment, an ionizing network in the compartment for electrically charging the smoke particles, electrically grounded means for supporting the foods to be smoked, and a damper for controlling the volume of smoke introduced through said first and second smoke inlet means to effect a desired distribution and rate of introduction of smoke in the compartment.

3. Apparatus for smoking fish comprising a smoke generator, a smoke inlet compartment, a smoke compartment, a smoke outlet compartment, fan means for drawing smoke through the compartments, a smoke ionizing screen in the smoke compartment to charge the smoke particles, a tray for supporting fish to be smoked, horizontal guide rails in the said compartments for horizontally supporting the tray, door means in the outlet compartment permitting insertion of the fish laden tray into the smoke compartment, means in the smoke compartment for electrically grounding the tray and fish to attract the charged smoke particles to the fish surfaces, and a baffle in the inlet compartment for directing the smoke onto the ionizing screen as the smoke passes into the smoke compartment.

4. Apparatus for smoking fish comprising smoke producing means, a smoke compartment, a fan for drawing smoke through the smoke compartment, an ionizing screen in the smoke compartment for electrically charging the smoke particles, an electrically grounded fish tray horizontally disposed in the smoke compartment beneath the ionizing screen, and adjustable insulators supporting the said screen for effecting vertical adjustment of the clearance between the screen and the tray to control the rate and uniformity of smoke deposition on the fish tray.

5. Apparatus for smoking fish comprising a smoke generator, a smoke compartment, means for drawing smoke from the generator through the smoke compartment, an ionizing screen in the smoke compartment for electrically charging the smoke particles, continuous conveyor means for conveying fish through the smoke compartment, contacts for electrically grounding the continuous conveyor means in the smoke compartment to attract electrically charged smoke particles to the surface of the conveyor means, and adjustable supports for adjusting the ionizing screen with relation to the continuous conveyor means to control the deposition of charged smoke particles on the fish carried by the conveyor means.

6. Apparatus for smoking fish comprising a smoke generator, a smoke compartment, means for drawing smoke from the generator through the smoke compartment, an ionizing screen in the smoke compartment for electrically charging the smoke particles, continuous conveyor means for conveying fish through the smoke compartment, contacts for electrically grounding the continuous conveyor means in the smoke compartment to attract electrically charged smoke particles to the surface of the conveyor means, means for vertically adjusting the ionizing screen with relation to the continuous conveyor means to control the deposition of charged smoke particles on the fish carried by the conveyor means, and means for controlling the speed of the conveyor means.

7. Apparatus for smoking foods comprising a smoke compartment, means for passing smoke through the smoke compartment, a smoke particle ionizing member for electrically charging smoke particles in the smoke compartment, an electrically grounded food support spaced from the ionizing member, and an adjustable connection for adjusting the spacing between the ionizing member and the food support to control the uniformity and establish a desired rate of smoke deposition on the food support.

8. Apparatus for smoking foods comprising smoke producing means, a draft producing mechanism for drawing smoke through the smoke compartment, a smoke bypass for controlling the volume of smoke introduced into the compartment, a smoke particle ionizing member for electrically charging smoke particles in the smoke compartment, an electrically grounded food support spaced from the ionizing member and adjustable supports for the ionizing member for effecting adjustment of the space between the ionizing member and the food support to control the rate and uniformity of smoke deposition on the food support.

GLENN A. LAWRENCE.

REFERENCES CITED

The following references are of record in the file of this patent:

UNITED STATES PATENTS

| Number | Name | Date |
|---|---|---|
| 843,368 | Schmitt | Feb. 5, 1907 |
| 1,290,421 | Ullin | Jan. 7, 1919 |
| 1,402,204 | Alsop | Jan. 3, 1922 |
| 1,483,668 | Little | Feb. 12, 1924 |
| 1,534,867 | Peschke et al. | Apr. 21, 1925 |
| 1,719,353 | Alsop | July 2, 1929 |
| 1,719,354 | Alsop | July 2, 1929 |
| 1,723,145 | Fernald | Aug. 6, 1929 |
| 1,965,609 | Smith | July 10, 1934 |
| 2,064,522 | Davis | Dec. 15, 1936 |
| 2,078,639 | Rohrman | Apr. 27, 1937 |
| 2,100,155 | Beran | Nov. 23, 1937 |
| 2,318,093 | Penney | May 4, 1943 |
| 2,342,373 | Schiewe | Feb. 22, 1944 |
| 2,425,652 | Starkey | Aug. 12, 1947 |
| 2,463,422 | Ransburg | Mar. 1, 1949 |